United States Patent
Zappaterra et al.

(10) Patent No.: US 10,292,137 B1
(45) Date of Patent: May 14, 2019

(54) REDUCING LATENCY IN AN UNLICENSED FREQUENCY SPECTRUM

(71) Applicant: Sprint Spectrum LP, Overland Park, KS (US)

(72) Inventors: Luca Zappaterra, Eindhoven (NL); Yu Zhou, Herndon, VA (US); Muhammad Ahsan Naim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 95 days.

(21) Appl. No.: 15/291,095

(22) Filed: Oct. 12, 2016

(51) Int. Cl.
| | |
|---|---|
| *H04L 12/26* | (2006.01) |
| *H04W 72/02* | (2009.01) |
| *H04W 72/12* | (2009.01) |
| *H04L 1/00* | (2006.01) |
| *H04W 72/04* | (2009.01) |
| *H04L 29/06* | (2006.01) |
| *H04B 17/318* | (2015.01) |
| *H04W 84/04* | (2009.01) |
| *H04W 84/12* | (2009.01) |

(52) U.S. Cl.
CPC .......... *H04W 72/02* (2013.01); *H04B 17/318* (2015.01); *H04L 1/0018* (2013.01); *H04L 43/16* (2013.01); *H04L 69/28* (2013.01); *H04W 72/0486* (2013.01); *H04W 72/1263* (2013.01); *H04W 84/042* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,942,366 B2 * | 4/2018 | Park | H04L 69/323 |
| 2012/0113918 A1 * | 5/2012 | Freda | H04W 72/1205 370/329 |
| 2013/0051358 A1 * | 2/2013 | Turtinen | H04W 74/0816 370/330 |
| 2015/0109227 A1 * | 4/2015 | Shin | G06F 3/044 345/173 |
| 2015/0351115 A1 | 12/2015 | Jeon et al. | |
| 2015/0365931 A1 * | 12/2015 | Ng | H04L 1/1812 370/329 |
| 2016/0088631 A1 | 3/2016 | Hedayat et al. | |
| 2016/0119846 A1 * | 4/2016 | Chou | H04W 36/22 370/331 |
| 2017/0303314 A1 * | 10/2017 | Cariou | H04L 43/16 |

* cited by examiner

*Primary Examiner* — Minh Trang T Nguyen

(57) ABSTRACT

Reducing latency in a wireless network includes initiating a sensing period for measuring signal indicators of a plurality of frequency channels of an unlicensed spectrum, determining that one of the plurality of frequency channels is able to sustain a traffic load, interrupting the sensing period, and scheduling one or more cellular subframes during the remainder of the sensing period using the one of the plurality of frequency channels.

20 Claims, 7 Drawing Sheets

REDUCING LATENCY IN AN UNLICENSED FREQUENCY SPECTRUM

TECHNICAL BACKGROUND

There are ongoing challenges associated with the growth and evolution of wireless networks. For example, a macrocell or picocell access node may be configured to deploy multiple carriers within different frequency bands, such as a primary carrier utilizing a licensed frequency band in a primarily cellular mode of operation, and a secondary carrier utilizing an unlicensed frequency band that shares its spectrum with other modes of operation such as Wi-Fi. An example of utilizing unlicensed frequency bands is LTE-U, which is used by access nodes to deploy cellular carriers using Wi-Fi frequency bands in a cellular operating mode. However, utilizing an unlicensed spectrum requires periodically scanning a signal indicator of one or more frequency channels of the unlicensed spectrum, to determine whether or not the frequency channels have the capacity to sustain a load of the access node. Since the frequency channels may be used by other devices (such as, for instance, Wi-Fi routers), determining an appropriate frequency channel is necessary to deploy cellular subframes on the unlicensed frequency band. The periodic scanning occurs during a defined sensing period, which can cause delays and reduced quality of service (QoS) for delay-sensitive cellular applications requiring low latency, such as Voice over IP (VoIP), streaming, gaming, etc.

OVERVIEW

Exemplary embodiments described herein include methods and processing nodes for reducing latency in a wireless network utilizing an unlicensed frequency band. An exemplary method for reducing latency in a wireless network includes measuring, during a sensing period, a first signal indicator of a first frequency channel deployed by an access node, and scheduling one or more cellular subframes in the first frequency channel during the sensing period based upon the first signal indicator meeting a load threshold. The sensing period comprises an initial portion of a master frame.

An exemplary system for reducing latency in a wireless network includes an access node deploying a plurality of frequency channels using an unlicensed frequency band, and a processor coupled to the access node. The processor enables the access node to perform operations including determining a traffic load of the access node, for a defined time period, sequentially determining if each of the plurality of frequency channels is able to sustain the traffic load and, upon determining that one of the plurality of frequency channels is able to sustain the traffic load, scheduling one or more cellular subframes in said one of the plurality of frequency channels prior to expiration of the defined time period.

An exemplary processing node for reducing latency in a wireless network is configured to perform operations including initiating a sensing period for measuring signal indicators of a plurality of frequency channels of an unlicensed spectrum, determining that one of the plurality of frequency channels is able to sustain a traffic load, and scheduling one or more cellular subframes during the sensing period using the one of the plurality of frequency channels.

DETAILED DESCRIPTION

Figure 1:
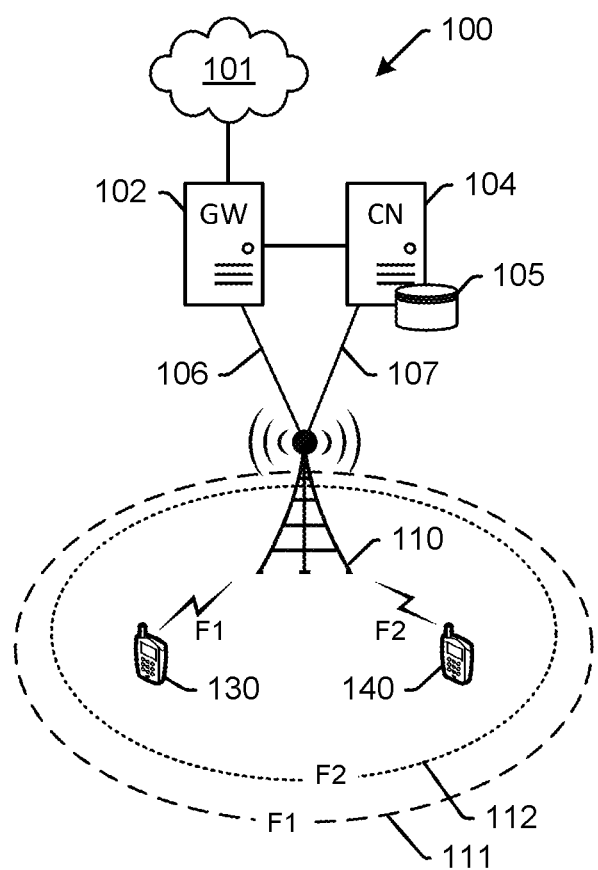
FIG. 1 depicts an exemplary system for reducing latency in a wireless network.

In exemplary embodiments disclosed herein, a wireless network utilizing an unlicensed frequency band is configured to minimize latency by interrupting a sensing period used to determine an appropriate channel of the unlicensed frequency band and inserting cellular subframes into the remainder of the sensing period. The wireless network may include an access node that is configured to deploy one or more carriers, at least one of which utilizes the unlicensed frequency band. For instance, the access node can deploy a primary carrier using a first frequency band comprising a licensed spectrum, and a secondary carrier using a second frequency band comprising an unlicensed spectrum. The unlicensed frequency band may be divided into a plurality of channels, each of which comprises a frequency sub-band of the unlicensed frequency band. The secondary carrier may generally utilize an operating mode that is different from an operating mode of the primary carrier. For example, while the primary carrier may be configured to utilize frequency bands licensed for LTE communication, the secondary carrier may be configured to utilize unlicensed frequency bands that are normally used for Wi-Fi or other types of radio communications.

The access node may further be configured to deploy the secondary carrier in either a Wi-Fi operating mode or in a cellular operating mode. In the cellular operating mode, one or more cellular subframes can be scheduled in the secondary carrier. In other words, the secondary carrier may be switched back and forth from a Wi-Fi operating mode to a cellular operating mode. Switching between operating modes may hereafter be referred to as a "duty cycle", which includes determining a number of cellular subframes required in the secondary carrier prior to determining when and how often the secondary carrier is switched to the cellular operating mode. The duty cycle may be determined based on a load of the access node. The load may comprise a traffic requirement and/or a latency requirement, and may be based on requirements of wireless devices connected to the access node. For example, wireless devices utilizing Voice over IP (VoIP), multimedia streaming, etc. require high traffic and latency. The load may be based on a load of a primary carrier, or any number of carriers deployed by the access node. As further described herein, cellular subframes are scheduled in the secondary carrier in various combinations based in part on the measured loads. Therefore, the load may include a load of traffic and/or signaling that needs to be offloaded from the primary carrier to the secondary carrier.

To minimize latency, operations described herein include comparing a capacity of each frequency channel of a carrier deploying the unlicensed frequency band to the load to determine whether or not each frequency channel is capable of sustaining the load (or portions thereof). The capacity of each frequency channel is determined during a defined time period that is hereinafter referred to as the "sensing period." In some embodiments, the sensing period occurs at the beginning of every transmission frame of the secondary carrier. In other embodiments, the sensing period occurs twice within every transmission frame; once at the beginning, and once halfway through the frame. During the sensing period, a signal indicator of each frequency channel is determined sequentially, i.e. one channel at a time, and is used to determine the capacity of the frequency channel. The capacity is compared with the load to be carried by the frequency channel to determine if the frequency channel is able to sustain the load. If the frequency channel is unable to sustain the load, the capacity of the next frequency channel in the sequence is determined. This process continues until a frequency channel is determined to be able to sustain the load, upon which the sequential sensing is stopped, and one or more cellular subframes are scheduled in remainder of the sensing period, or prior to expiration of the sensing period. The sequence of frequency channels scanned during the sensing period may be any sequence, such as numerical, etc. In some embodiments, a historical trend of signal strength indicators for each frequency channel is determined, and the sequential capacity determination is performed in decreasing order of the historic trend of signal strength indicators, thereby ensuring that the frequency channel with the highest average past capacity is sensed first.

Subsequent to the sensing period, a duty cycle of cellular subframes may be scheduled in the frequency channel that is determined (during the sensing period) to be able to sustain the load. The duty cycle may be based on the load. The duty cycle comprises switching the frequency channel from a first operating mode to a second operating mode, and scheduling the one or more cellular subframes using the second operating mode. In an exemplary embodiment where the frequency channel is part of an unlicensed spectrum, the first operating mode comprises Wi-Fi and the second operating mode comprises cellular data. Thus, the frequency channel may be switched back and forth from a Wi-Fi operating mode to a cellular operating mode depending on the load. For example, a quantity of cellular subframes to be scheduled in a secondary carrier of an access node may be determined based on a traffic load of the primary carrier. Moreover, the Wi-Fi operating mode may be a default operating mode of the frequency channel. For example, switching operating modes may comprise switching the cellular operating mode between an ON and an OFF mode, wherein in the OFF mode, the default operating mode is the Wi-Fi operating mode. In addition, depending on a latency requirement of the access node (based on, for example, application requirements of wireless devices connected thereto), additional cellular subframes may be scheduled in the frequency channel immediately subsequent to expiration of the sensing period. The latency requirement may exceed a threshold to trigger insertion of the additional cellular subframes immediately after the sensing period, rather than using the default (i.e. Wi-Fi) operating mode, thereby minimizing any interruption, latency, or loss of quality during the communication session. These and additional operations are further described with respect to the embodiments depicted in FIGS. 1-7 below.

Figure 2:
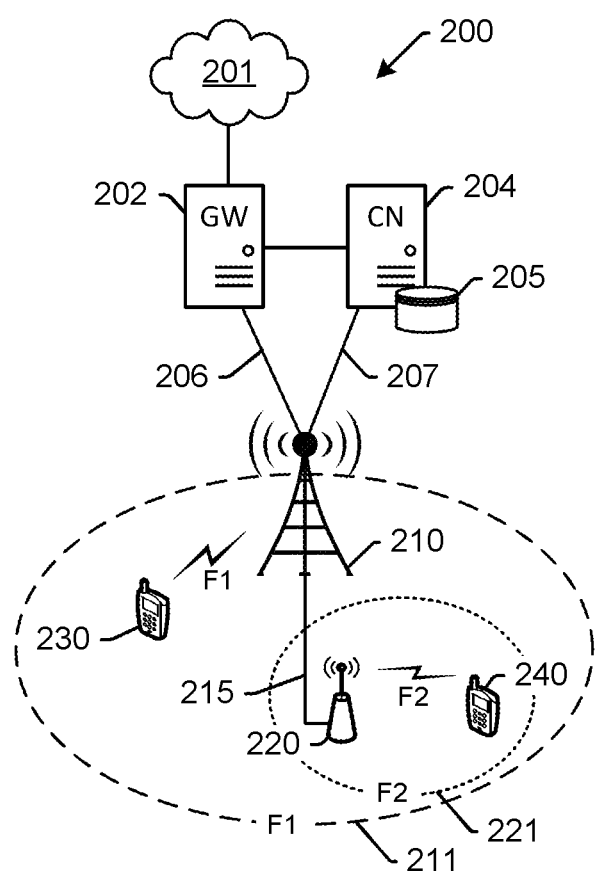
FIG. 2 depicts another exemplary system for reducing latency in a wireless network.

FIGS. 1 and 2 depict exemplary systems 100 and 200 for scheduling subframes. Referring to FIG. 1, system 100 comprises a communication network 101, gateway 102, controller node 104, access node 110, and wireless devices 130, 140. Access node 110 can be any network node configured to provide communication between end-user wireless devices 130, 140 and communication network 101. For example, access node 110 may include any standard access node, such as a macrocell access node, base transceiver station, a radio base station, an eNodeB device, an enhanced eNodeB device, or the like. Access node 110 can be configured to deploy a primary carrier utilizing a frequency F1 and having a coverage area 111, and a secondary carrier utilizing a frequency F2 and having a coverage area 112. Access node 110 may utilize multiple antennae/transceiver combinations to deploy these carriers. Wireless device 130 may connect to access node 110 using frequency F1, and wireless device 140 may connect to access node 110 using frequency F2. In an exemplary embodiment, frequency F1 may comprise a licensed frequency band, including bands licensed for cellular operation such as, for instance, bands of frequencies around 850 Mhz and 2.5 Ghz. Moreover, frequency F2 may comprise an unlicensed frequency band, including bands commonly utilized for Wi-Fi operation such as, for instance, bands somewhere around 2.4 GHz, 3.6 GHz. Further, any two carriers using frequencies F1 and F2 may be aggregated to provide carrier aggregation (CA) services to wireless devices. Carriers utilizing frequency F2 may be deployed using a Wi-Fi operating mode. Other combinations of frequency bands are possible.

Referring to FIG. 2, system 200 comprises a communication network 201, gateway 202, controller node 204, first access node 210, second access node 220, and wireless devices 230, 240. Access node 210 can be any network node configured to provide communication between end-user wireless device 230 and communication network 201. For example, access node 210 may include any standard access node, such as a macrocell access node, base transceiver station, a radio base station, an eNodeB device, an enhanced eNodeB device, or the like. Access node 210 can be configured to deploy a carrier utilizing a frequency F1 and having a coverage area 211. Thus, wireless device 230 may connect to access node 210 using frequency F1. Moreover, access node 220 can be any network node configured to provide communication between end-user wireless device 240 and communication network 201 via access node 210. For example, access node 220 can be any short range, low power, small access node, such as a femtocell, picocell, home eNodeB (HeNB), or the like. Access node 220 may be configured to deploy a carrier utilizing a frequency F2 and having a coverage area 221. Thus, wireless device 240 may connect to access node 220 using frequency F2. Further, access node 220 may be communicatively coupled to access node 210 via a communication link 215 that comprises, for instance, an X2 communication link. Thus, access node 220 may be configured to relay services from access node 210 to wireless device 240, and to offload wireless devices from access node 210 when a carrier using frequency F1 deployed by access node 210 is overloaded.

In operation, carriers using frequency band F2 (hereinafter, carrier F2) may be operated in either a Wi-Fi operating mode or in a cellular operating mode. In the cellular operating mode, one or more cellular subframes can be scheduled in carrier F2. In other words, carrier F2 may be switched back and forth from a Wi-Fi operating mode to a cellular operating mode. Switching between operating modes may hereafter be referred to as a "duty cycle", which includes determining a number of cellular subframes required in carrier F2 prior to determining when and how often carrier F2 is switched to the cellular operating mode. The duty cycle may be determined based on a load of one or more of access nodes 110, 210, and 220. For example, the load may comprise a traffic requirement and/or a latency requirement, and may be based on requirements of wireless devices 130, 140, 230, 240. In system 100, for example, the load may be based on a load of primary carrier F1 deployed by access node 110. Similarly, in system 200, for example, the load may be based on a load of carrier F1 deployed by access node 210. Therefore, the load may include a load of traffic and/or signaling that needs to be offloaded from carrier F1 to carrier F2.

As described herein, at least carrier F2 may comprise a frequency range with a plurality of frequency sub-ranges, hereinafter referred to as "frequency channels." In operation, a capacity of each frequency channel of carrier F2 is obtained, and compared with the load to determine whether or not the frequency channel is capable of sustaining the load (or portions thereof). The capacity of each frequency channel is determined during a defined "sensing period" during which a signal indicator of each frequency channel is measured, and a capacity determined based on the frequency channel. The capacity is compared with the load to be carried by the frequency channel to determine if the frequency channel is able to sustain the load. If the frequency channel is unable to sustain the load, the capacity of the next frequency channel in the sequence is determined. This process continues until a frequency channel is determined to be able to sustain the load, upon which the sequential sensing is stopped, and one or more cellular subframes are scheduled in remainder of the sensing period, or prior to expiration of the sensing period.

Subsequent to the sensing period, a duty cycle of cellular subframes may be scheduled in the frequency channel that is determined (during the sensing period) to be able to sustain the load. The duty cycle may be based on the load. The duty cycle comprises switching the frequency channel from a first operating mode to a second operating mode, and scheduling the one or more cellular subframes using the second operating mode. For example, with reference to FIG. 1, a quantity of cellular subframes to be scheduled in secondary carrier F2 deployed by access node 110 may be determined based on a load of primary carrier F1, or a combination of load on primary carrier F1 and secondary carrier F2. With reference to FIG. 2, for instance, a quantity of cellular subframes to be scheduled in carrier F2 deployed by access node 220 may be determined based on a load of carrier F1 deployed by access node 210, or a combination of load on carriers F1 and F2.

Access nodes 110, 210, 220 can comprise a processor and associated circuitry to execute or direct the execution of computer-readable instructions to perform operations such as those further described herein. Briefly, access nodes 110, 210, 220 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 210, 220 can receive instructions and other input at a user interface. At least access nodes 110 and 210 communicate directly with gateway nodes 102, 202 and controller nodes 104, 204 via communication links 106, 107, 206, 207 respectively. Further, access nodes 210 and 220 may communicate with each other (and with other access nodes that are not shown) using a direct link such as an X2 link 215 or similar.

Wireless devices 130, 140, 230, 240 may be any device, system, combination of devices, or other such communication platform capable of communicating wirelessly with access nodes 110, 210, 220 respectively, using one or more frequency bands deployed therefrom. Wireless devices 130, 140, 230, 240 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 210, 220. Other types of communication platforms are possible.

Communication networks 101, 201 can be wired and/or wireless communication networks, and can comprise processing nodes, routers, gateways, and physical and/or wireless data links for carrying data among various network elements, including combinations thereof, and can include a local area network a wide area network, and an internetwork (including the Internet). Communication networks 101, 201 can be capable of carrying data, for example, to support voice, push-to-talk, broadcast video, and data communications by wireless devices 130, 140, 230, 240, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication networks 101, 201 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication networks 101, 201 can also comprise additional base stations, controller nodes, telephony switches, internet routers, network gateways, computer systems, communication links, or some other type of communication equipment, and combinations thereof.

Communication links 106, 107, 206, 207 can use various communication media, such as air, space, metal, optical fiber, or some other signal propagation path-including combinations thereof. Communication links 106, 107, 206, 207 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107, 206, 207 can be a direct link or might include various equipment, intermediate components, systems, and networks. Communication links 106, 107, 206, 207 may comprise many different signals sharing the same link.

Gateway nodes 102, 202 can be any network node configured to interface with other network nodes using various protocols. Gateway nodes 102, 202 can communicate user data over system 100, 200 respectively. Gateway nodes 102, 202 can be a standalone computing device, computing system, or network component, and can be accessible, for example, by a wired or wireless connection, or through an indirect connection such as through a computer network or communication network. For example, gateway nodes 102, 202 can include a serving gateway (SGW) and/or a public data network gateway (PGW), etc. One of ordinary skill in the art would recognize that gateway nodes 102, 202 are not limited to any specific technology architecture, such as Long Term Evolution (LTE) and can be used with any network architecture and/or protocol.

Gateway nodes 102, 202 can comprise a processor and associated circuitry to execute or direct the execution of computer-readable instructions to obtain information. Gateway nodes 102, 202 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102, 202 can receive instructions and other input at a user interface.

Controller nodes 104, 204 can be any network node configured to communicate information and/or control information over system 100, 200 respectively. Controller nodes 104, 204 can be configured to transmit control information associated with a handover procedure. Controller nodes 104, 204 can be a standalone computing device, computing system, or network component, and can be accessible, for example, by a wired or wireless connection, or through an indirect connection such as through a computer network or communication network. For example, controller nodes 104, 204 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller nodes 104, 204 are not limited to any specific technology architecture, such as Long Term Evolution (LTE) and can be used with any network architecture and/or protocol.

Controller nodes 104, 204 can comprise a processor and associated circuitry to execute or direct the execution of computer-readable instructions to obtain information. Controller nodes 104, 204 can retrieve and execute software from storage, which can include a disk drive, a flash drive, memory circuitry, or some other memory device, and which can be local or remotely accessible. In an exemplary embodiment, controller nodes 104, 204 respectively include databases 105, 205 for storing information related to access nodes 110, 210, 220, such as load, carriers deployed, etc. This information may be requested by or shared with access nodes 110, 210, 220 via connections 106, 107, 206, 207, X2 connections, and so on. The software comprises computer programs, firmware, or some other form of machine-readable instructions, and may include an operating system, utilities, drivers, network interfaces, applications, or some other type of software, and combinations thereof. Controller nodes 107, 207 can receive instructions and other input at a user interface.

Other network elements may be present in systems 100, 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 210, 220, and communication networks 101, 201.

Figure 3:
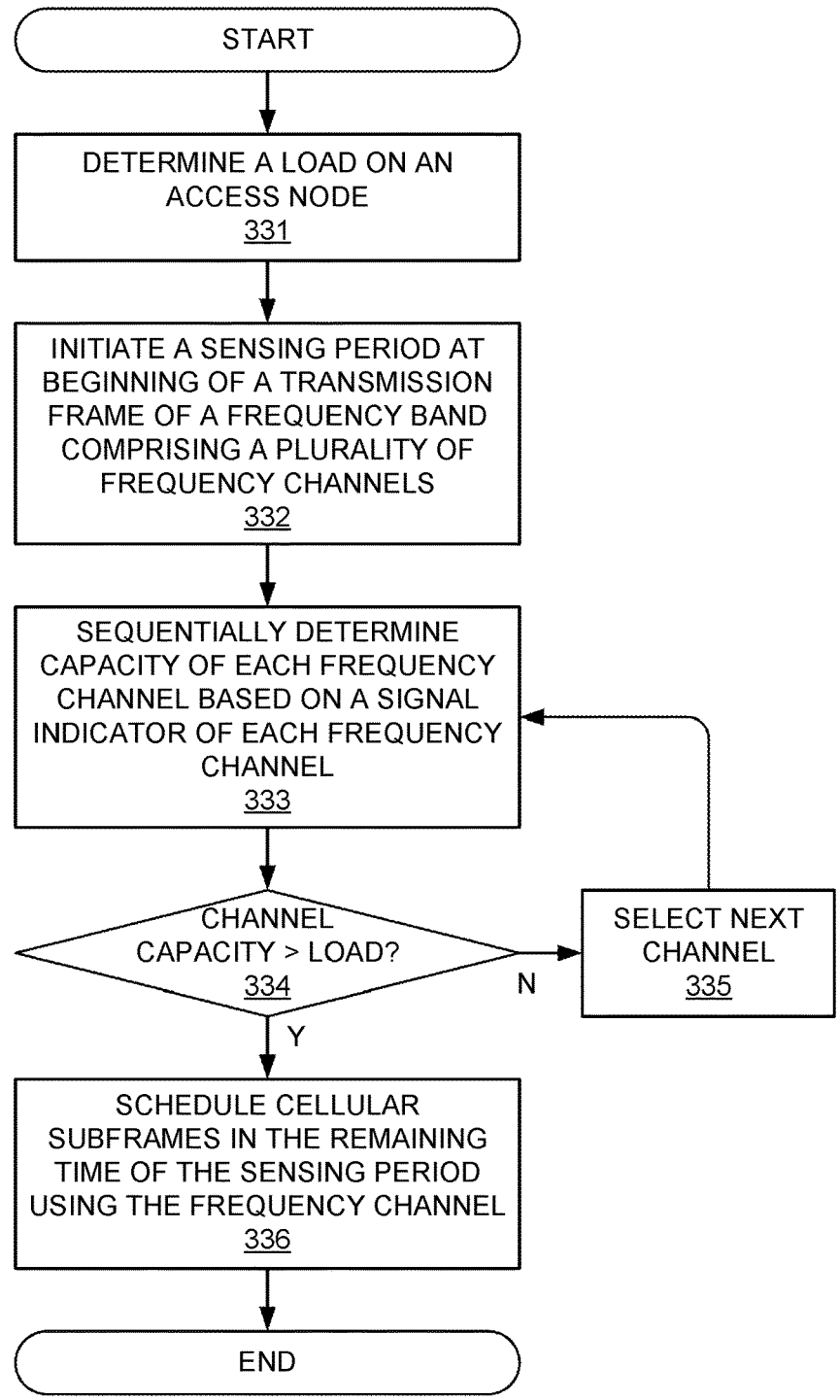
FIG. 3 depicts an exemplary method for reducing latency in a wireless network.

FIG. 3 depicts an exemplary method for reducing latency in a wireless network. The method of FIG. 3 is illustrated with respect to an access node such as access node 110 of FIG. 1, or access nodes 210 or 220 of FIG. 2. In other embodiments, the method can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 331, with a determination of a load on an access node. The access node can be configured to deploy one or more carriers, such as, for instance, a primary carrier using a first frequency band comprising a licensed spectrum, and a secondary carrier using a second frequency band comprising an unlicensed spectrum. The primary carrier may be configured to utilize frequency bands licensed for cellular communication such as, for instance, LTE, and the secondary carrier may be configured to utilize unlicensed frequency bands that are normally used for Wi-Fi or other types of radio communications. Moreover, the secondary carrier may be operated in either a Wi-Fi operating mode or in a cellular operating mode based on a duty cycle determined based on the load of the access node. For instance, the load may comprise a traffic requirement and/or a latency requirement, and may be based on requirements of wireless devices connected to the access node. The load may be based on a load of the primary carrier, or any combination of the primary carrier and the secondary carrier. The load may include a load of traffic and/or signaling for wireless devices that needs to be offloaded from the primary carrier to the secondary carrier.

Moreover, the unlicensed frequency band may be divided into a plurality of sub-bands or frequency channels. Thus, at 332, a sensing period is initiated, during which capacities of one or more frequency channels are determined and compared with the load in 333-334. The sensing period is a defined time period that occurs at the beginning of every transmission frame of the secondary carrier, and may further occur twice within every transmission frame; once at the beginning, and once halfway through the frame. The length of the sensing period (measured in milliseconds ms) may be predefined by a network operator. In one exemplary embodiment, the sensing period is 20 ms long, and occurs at the beginning of and halfway through a 1000 ms transmission frame, thereby leaving two 480 ms portions of the transmission frame for scheduling cellular or Wi-Fi subframes, as further described in FIG. 4.

At 333, during the sensing period, a signal indicator of each frequency channel is determined sequentially, i.e. one channel at a time, and is used to determine the capacity of the frequency channel to determine whether or not said each frequency channel is capable of sustaining the load (or portions thereof). In one exemplary embodiment, the signal indicator may comprise, for instance, a receive signal strength indicator (RSSI) of the frequency channel. In other exemplary embodiments, the signal indicator may be any value that provides an indicator of resources available in the frequency channel. For example, the resources available may comprise physical resource blocks (PRBs), throughput, etc. In either case, the signal indicator is correlated with a capacity of the frequency channel.

At 334, the capacity of each frequency channel is compared with the load to be carried by the frequency channel to determine if the frequency channel is able to sustain the load. If the frequency channel is unable to sustain the load, the next frequency channel in the sequence is selected at 335, and the capacity of the next frequency channel is determined at 333. Operations 333-335 continue until a frequency channel is determined to be able to sustain the load, upon which the sequential sensing is stopped at 336, and one or more cellular subframes are scheduled in remainder of the sensing period, or prior to expiration of the sensing period.

The sequence of frequency channels processed at 333-335 during the sensing period may be any sequence, such as numerical, etc. In some embodiments, a historical trend of signal strength indicators for each frequency channel is determined, and the sequential capacity determination is performed in decreasing order of the historic trend of signal strength indicators, thereby ensuring that the frequency channel with the highest average past capacity is sensed first. Moreover, a duty cycle of cellular subframes may be scheduled in the frequency channel based on the load, subsequent to the sensing period. The duty cycle comprises switching the frequency channel from a first operating mode to a second operating mode, and scheduling the one or more cellular subframes using the second operating mode. For example, depending on a latency requirement of the access node (based on, for example, application requirements of wireless devices connected thereto), additional cellular subframes may be scheduled in the frequency channel immediately subsequent to expiration of the sensing period.

Figure 4:
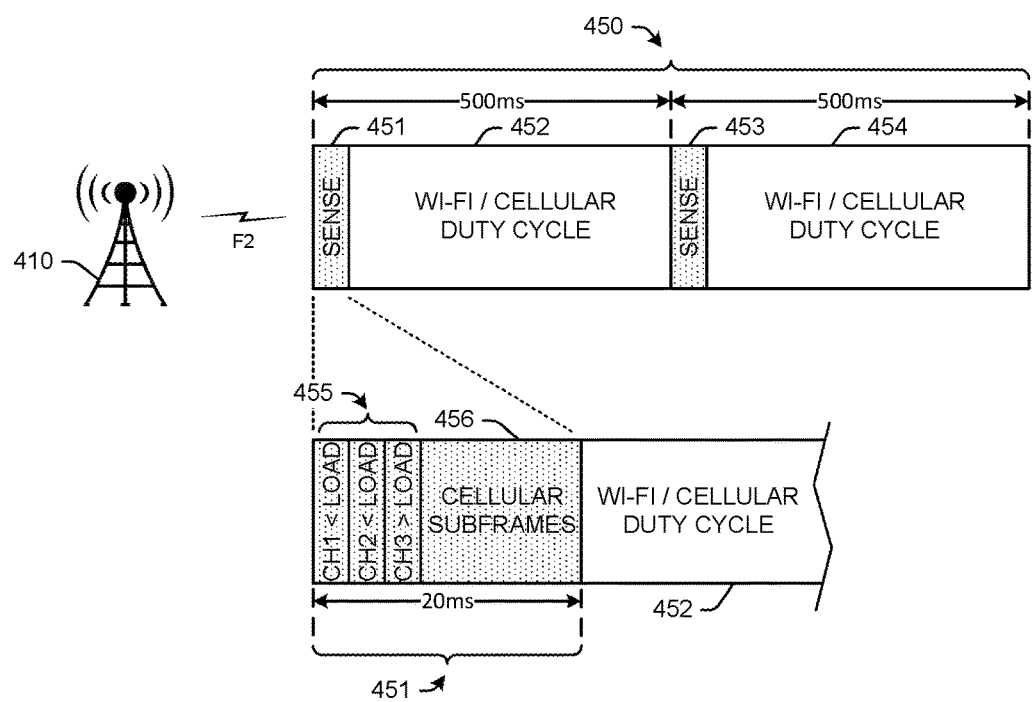
FIG. 4 depicts exemplary cellular subframes within a sensing period of a frame.

FIG. 4 depicts exemplary cellular subframes 456 within a sensing period 451 of a frame 450. Frame 450 may be part of a carrier deployed on frequency band F2 (hereinafter "carrier F2") deployed by access node 410. For instance, carrier F2 may be deployed using an unlicensed frequency band, including bands commonly utilized for Wi-Fi operation such as, for instance, bands somewhere around 2.4 GHz, 3.6 GHz. Further, frame 450 may be scheduled with one or more sensing periods 451, 453 during which capacities of one or more frequency channels (CH1, CH2, CH3, etc.) 455 are determined and compared with a load of access node 410. The sensing periods 451, 453 comprise a defined time period occurring once at the beginning and once halfway through frame 450. For example, a first sensing period 451 occurs at the beginning of frame 450, and lasts 20 ms, and a second sensing period 453 occurs halfway through frame 450 and also lasts 20 ms. Thus, a first 480 ms portion 452 of frame 450 is used for scheduling cellular or Wi-Fi subframes (i.e. a duty cycle), and a second 480 ms portion 454 of frame 450 is used for the duty cycle. The length of the sensing period (measured in milliseconds ms) may be predefined by a network operator. Further, the duty cycle comprises switching an operation mode of frame 450 between a Wi-Fi operating mode and an LTE operating mode, based in part on the load on access node 410, and/or available resources/capacities of frequency channels on carrier F2.

As described herein, during sensing period 451, a signal indicator of each frequency channel is determined sequentially, i.e. one channel at a time, and is used to determine the capacity of the frequency channel to determine whether or not said each frequency channel is capable of sustaining the load (or portions thereof). For example, if a signal indicator of a frequency channel CH1 does not meet a threshold (based in part on the load, hereinafter "load threshold"), a signal indicator of a second frequency channel CH2 is measured. As shown in time period 455 within sensing period 451, the second frequency channel CH2 also does not have sufficient capacity to meet the load threshold, and a signal indicator of a third frequency channel CH3 is measured. Generally, measurements continue until a frequency channel is determined to be able to sustain the load. In this exemplary embodiment, the capacity of frequency channel CH3 is determined to satisfy the load threshold. At this point, the sequential sensing is stopped and one or more cellular subframes are scheduled in remainder 456 of sensing period 451. Thus, rather than continue sensing channels throughout the sensing period 451, only a portion 455 of the sensing period is utilized to determine a channel that can satisfy the load of access node 410, and then the sensing is interrupted and cellular subframes scheduled in the remainder 456 of sensing period 451. The sequence of frequency channels CH1, CH2, CH3, etc. processed in period 455 may be any sequence, such as numerical, etc. In some embodiments, a historical trend of signal strength indicators for each frequency channel is determined, and the sequential capacity determination is performed in decreasing order of the historic trend of signal strength indicators, thereby ensuring that the frequency channel with the highest average past capacity is sensed first.

While not shown in FIG. 4 but known to those of ordinary skill in the art, frame 450 may include subframes, including, for example, a number of OFDM symbols in the time domain and a number of subcarrier frequencies (aka, subcarriers) in the frequency domain. An OFDM symbol in time and a subcarrier in frequency together may define a resource element (RE). A physical resource block (PRB) may be defined, for example, in LTE networks, as 12 consecutive subcarriers in the frequency domain and all the OFDM symbols in a slot in the time domain. PRBs can be used, for example, to describe the mapping of certain physical channels to resource elements. Resources (e.g. PRBs) within may be allocated for control information such as, for example, downlink (DL) or uplink (UL) data scheduling information, or grants, from an access node to one or more wireless devices. The scheduling information may include, for example, a resource allocation, a modulation and coding rate (or derived from transport block size), the identity of the intended wireless device(s), and other information. Resources further carry data channels such as PDSCH, PBCH (physical broadcast channel), PSS/SSS (primary synchronization signal/secondary synchronization signal), and CSI-RS (channel state information reference signal), including uplink and downlink user data, and cell-specific reference signals.

Figure 5:
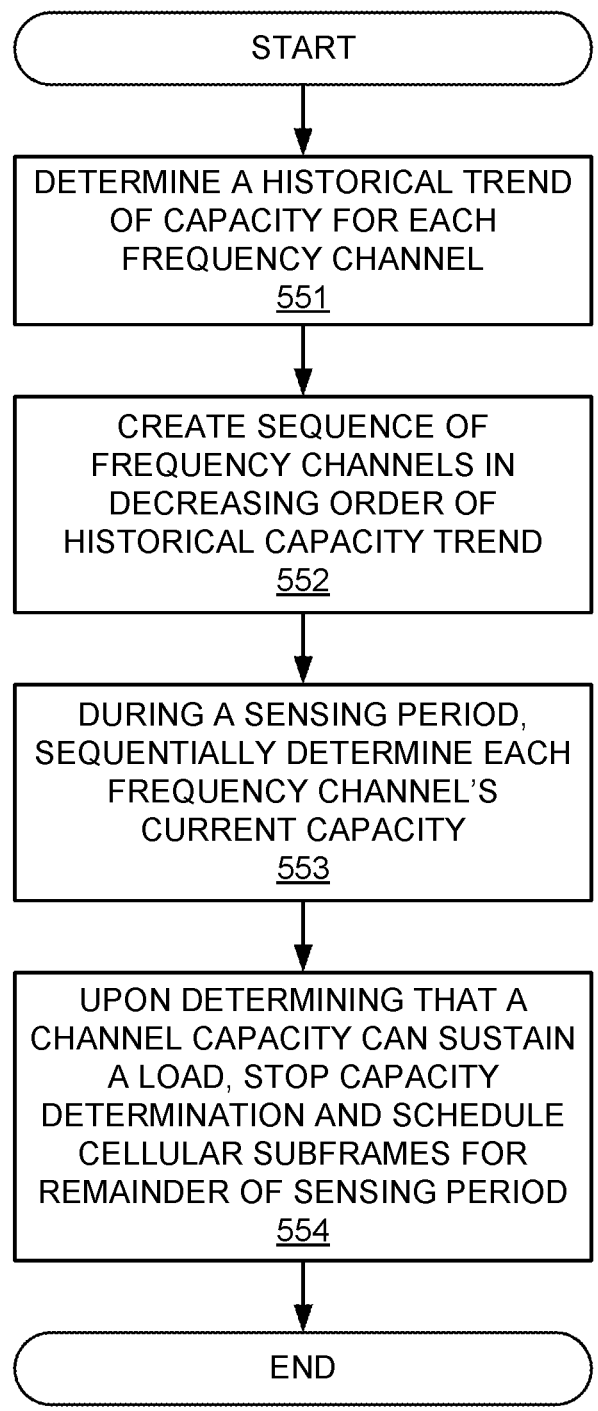
FIG. 5 depicts an exemplary method for sequencing frequency channels of an unlicensed spectrum.

FIG. 5 depicts an exemplary method for sequencing frequency channels of an unlicensed spectrum. The method of FIG. 5 is illustrated with respect to an access node such as access node 110 of FIG. 1, or access node 220 of FIG. 2. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 551, a historical trend of signal strength indicators for each frequency channel is determined. The historical trend may be based on past measurements stored on, for instance, a database coupled to an access node or controller on the wireless network. An average historical trend may be determined. At 552, a sequence of frequency channels is created in a decreasing or descending order of the historic trend of signal strength indicators. Then, at 553, during a sensing period, the capacity of each frequency channel is determined in order of the sequence created in step 552, thereby ensuring that the frequency channel with the highest average past capacity is sensed first. Subsequently, at 554, a frequency channel is determined to have sufficient capacity to satisfy the load, and then the sensing is interrupted and cellular subframes scheduled in the remainder of the sensing period.

Figure 6:
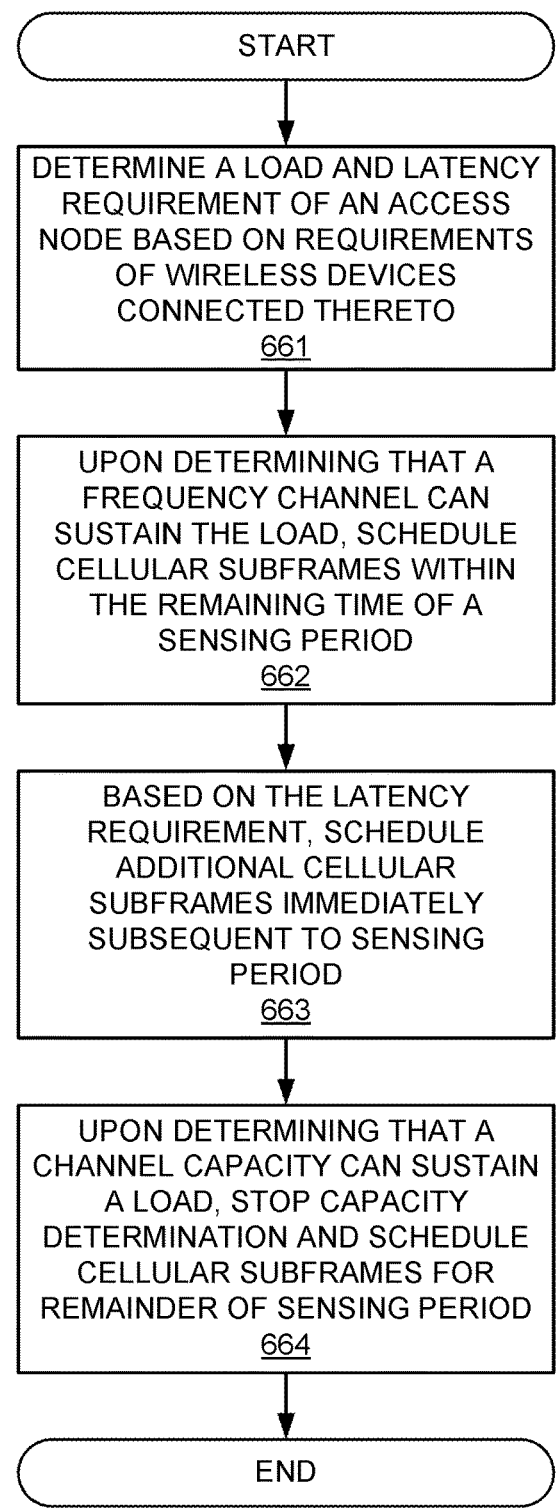
FIG. 6 depicts an exemplary method for scheduling additional cellular subframes after a sensing period.

FIG. 6 depicts an exemplary method for scheduling additional cellular subframes after a sensing period. The method of FIG. 6 is illustrated with respect to an access node such as access node 110 of FIG. 1, or access node 220 of FIG. 2. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 661, a load and latency requirement of an access node is determined based on requirements of wireless devices connected thereto. For example, a wireless device engaging in a VoIP or VoLTE session, or streaming multimedia, may require a low latency and a medium-to-high traffic throughput. Thus, at 662, upon determining that a frequency channel can sustain the load, one or more cellular subframes are scheduled in the remaining time of the sensing period as described above. Further, the high load and latency requirement can be used to trigger a scheduling scheme or duty cycle in the frequency channel. For example, at 663, the latency requirement may exceed a threshold, and additional cellular subframes may be scheduled in the frequency channel immediately subsequent to expiration of the sensing period. This can be contrasted to a situation where a default operating mode of the frequency channel is a Wi-Fi or some other operating mode. In this case, the default operating mode is subject to an override, and the cellular operating mode is instead scheduled, whereby insertion of the additional cellular subframes immediately after the sensing period is performed. This further helps minimize any interruption, latency, or loss of quality during the session.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100, 200 may be, comprise, or include computers systems and/or processing nodes. This includes, but is not limited to: access nodes 110, 210, 220, controller nodes 107, 207, and/or networks 101, 201.

Figure 7:
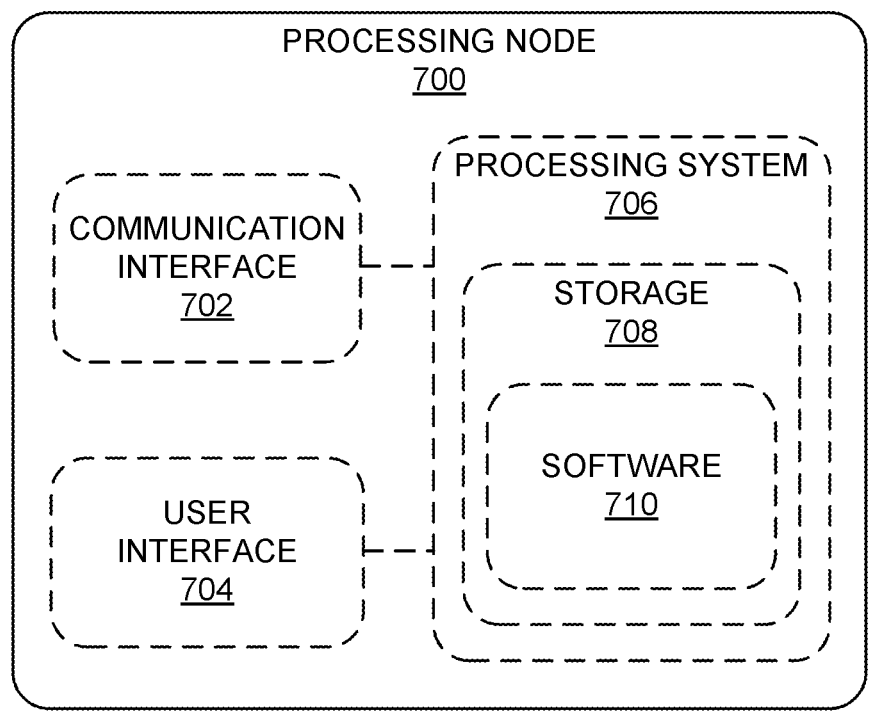
FIG. 7 depicts an exemplary processing node for reducing latency in a wireless network.

FIG. 7 depicts an exemplary processing node comprising a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a coherence determination module. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for reducing latency in a wireless network, the method comprising:
   measuring, during a sensing period, a first signal indicator of a first frequency channel deployed by an access node; and
   scheduling one or more cellular subframes in the first frequency channel during the sensing period based upon the first signal indicator meeting a load threshold, wherein the sensing period comprises an initial portion of a master frame.

2. The method of claim 1, further comprising measuring a second signal indicator of a second frequency channel during the sensing period based upon the first signal indicator not meeting the threshold.

3. The method of claim 2, further comprising scheduling the one or more cellular subframes using the second frequency channel during the sensing period based upon the second signal indicator meeting the threshold.

4. The method of claim 2, further comprising measuring a third signal indicator of a third frequency channel during the sensing period based upon the second signal indicator not meeting the threshold.

5. The method of claim 1, wherein scheduling the one or more cellular subframes comprises switching the first frequency channel from a first operating mode to a second operating mode, and scheduling the one or more cellular subframes using the second operating mode.

6. The method of claim 5, wherein:
the first operating mode comprises Wi-Fi,
the second operating mode comprises cellular data, and
the first frequency channel is a portion of an unlicensed frequency spectrum.

7. The method of claim 1, wherein the load threshold is based on a traffic load of the access node.

8. The method of claim 7, further comprising determining, based on the traffic load, a number of additional cellular subframes to be scheduled in the first frequency channel subsequent to the sensing period.

9. The method of claim 8, further comprising determining that a latency requirement of the traffic load meets a latency threshold, and scheduling one or more of the additional cellular subframes immediately after the sensing period.

10. The method of claim 1, wherein the one or more cellular subframes comprise any combination of downlink subframes or uplink subframes.

11. A system for scheduling resources in a wireless network, the system comprising:
an access node deploying a plurality of frequency channels using an unlicensed frequency band; and
a processor coupled to the access node, the processor for configuring the access node to perform operations comprising:
determining a traffic load of the access node;
for a defined time period, sequentially determining if each of the plurality of frequency channels is able to sustain the traffic load; and
upon determining that one of the plurality of frequency channels is able to sustain the traffic load, scheduling one or more cellular subframes in said one of the plurality of frequency channels prior to expiration of the defined time period.

12. The system of claim 11, wherein sequentially determining if each of the plurality of frequency channels is able to sustain the traffic load is based on a signal strength indicator of each of the plurality of frequency channels.

13. The system of claim 12, wherein the operations further comprise determining a historical trend of signal strength indicators for each frequency channel.

14. The system of claim 13, wherein the sequential determination is performed in decreasing order of the historic trend of signal strength indicators.

15. The system of claim 11, wherein the one or more cellular subframes is scheduled in said one of the plurality of frequency channels using a operating mode that is different from a default operating mode of said one of the plurality of frequency channels.

16. The system of claim 15, wherein the operations further comprise scheduling additional cellular subframes immediately subsequent to expiration of the defined time period.

17. The system of claim 15, wherein the operations further comprise switching to the default operating mode immediately subsequent to expiration of the defined time period.

18. A processing node for scheduling resources in a wireless network, the processing node being configured to perform operations comprising:
initiating a sensing period for measuring signal indicators of a plurality of frequency channels of an unlicensed spectrum;
determining that one of the plurality of frequency channels is able to sustain a traffic load; and
scheduling one or more cellular subframes during the sensing period using the one of the plurality of frequency channels.

19. The processing node of claim 18, wherein the traffic load is based on application requirements of one or more wireless devices, the application requirements further comprising a latency requirement.

20. The processing node of claim 19, wherein the operations further comprise scheduling additional downlink subframes immediately subsequent to expiration of the defined time period based on the latency requirement.

* * * * *